June 4, 1963  J. THEMASCUS  3,092,418
DUMPING WHEELBARROW
Filed Jan. 22, 1960  2 Sheets-Sheet 1

John Themascus
INVENTOR.

BY *Clarence A. O'Brien*
*and Harvey B. Jacobson*
Attorneys

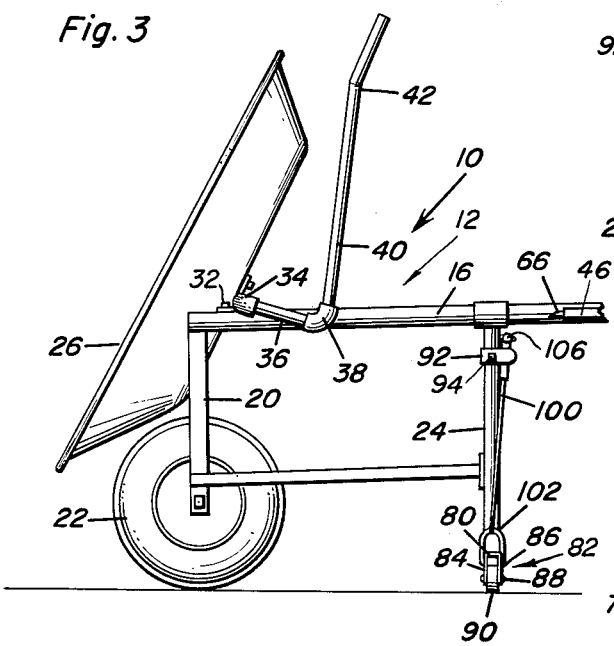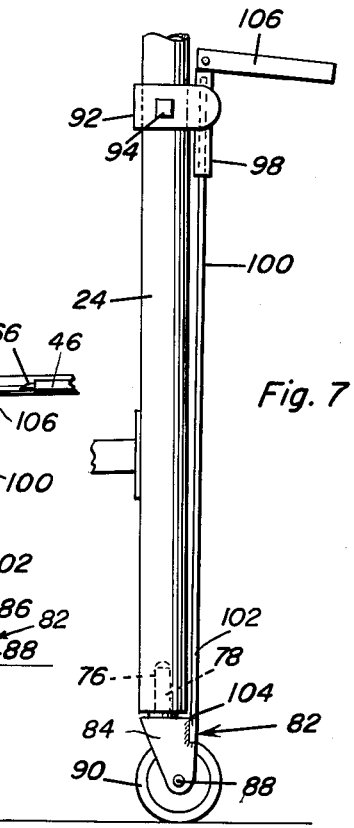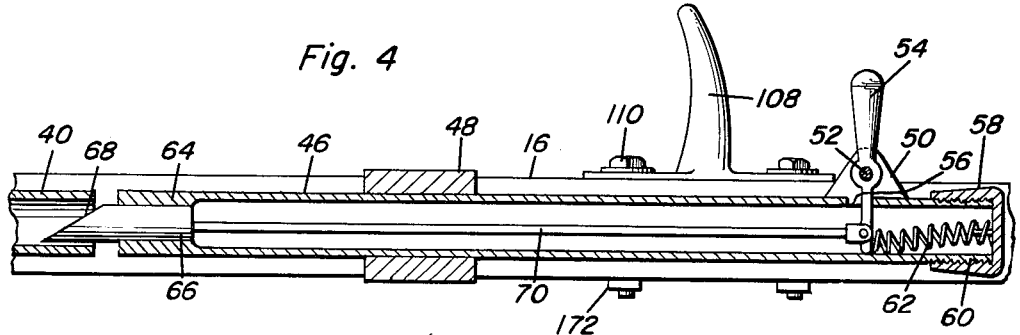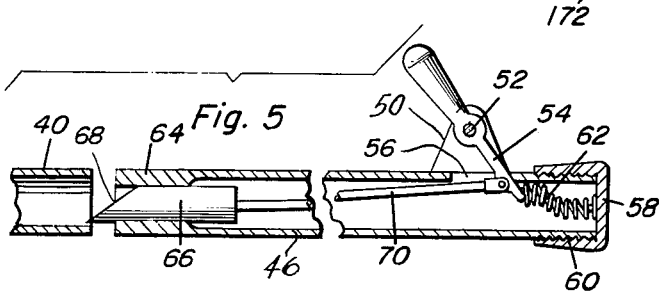

United States Patent Office 3,092,418
Patented June 4, 1963

3,092,418
DUMPING WHEELBARROW
John Themaseus, 1452 W. 69th St., Chicago 36, Ill.
Filed Jan. 22, 1960, Ser. No. 4,019
11 Claims. (Cl. 298—3)

This application is a continuation-in-part application of U.S. Serial No. 709,870, filed January 20, 1958, now abandoned.

This invention relates generally to wheelbarrows and more particularly to a novel and improved wheelbarrow construction which facilitates loading and dumping of the wheelbarrow.

Generally, wheelbarrows are utilized to transport relatively heavy loads over short distances. The wheelbarrow is generally loaded by hand or shovel and then the user will ordinarily lift the rear of the barrow so as to hold the barrow on the front central ground wheel. In order to facilitate rolling and obviate the necessity of lifting the rear of the barrow, it has been proposed to utilize barrows having a front wheel and a pair of rear ground wheels. However, it has often been found that when this type of construction is utilized, it is difficult to prevent the barrow from rolling when loading. Also, this type of construction has increased the difficulty in unloading or dumping the contents of the wheelbarrow inasmuch as it required a person to lift the rear of the barrow to a comparatively great height relative to the front wheel in order to dump the contents therefrom.

In view of the apparent disadvantages of wheelbarrows disclosed by the prior art, it is the principal object of this invention to provide an improved wheelbarrow construction utilizing both front and rear ground wheels with means being provided for preventing undesirable rolling of the barrow. Further, the invention includes means for facilitating the dumping of the barrow with said means obviating the necessity of lifting the rear of the barrow at all.

It is more particularly an object of this invention to provide a wheelbarrow construction wherein the barrow is secured to an axle rotatably carried by the barrow frame. The barrow is unbalanced on the axle and accordingly it is normally disposed in its dumping or unloading position. Releasable means are provided for retaining the barrow in a horizontal or loaded position with a pivotally mounted operator being utilized to release the means retaining the barrow so as to enable the unbalanced weight of the barrow to cause the dumping of the same.

It is still a more particular object of this invention to provide a wheelbarrow utilizing both front and rear ground wheels with the front ground wheel extending parallel to the longitudinal axis of the barrow. Means are provided for turning the rear ground wheels to a position perpendicular to the longitudinal axis so as to prevent rolling movement of the barrow.

It is still, a further object of this invention to provide a novel wheelbarrow construction which while introducing apparent advantages over the devices disclosed by the prior art, is relatively inexpensive to manufacture and reliable and durable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an elevational side view of the wheelbarrow construction illustrating the barrow in dumping position with the rear ground wheels being connected perpendicular to the front ground wheels for preventing rolling movement of the barrow;

FIGURE 4 is an enlarged sectional view illustrating the mechanism for retaining and releasing the barrow;

FIGURE 5 is a longitudinal sectional view similar to FIGURE 4 illustrating the pivotal operator in a releasing position;

FIGURE 7 is an enlarged fragmentary elevational view of a rear support member.

Figure 1:
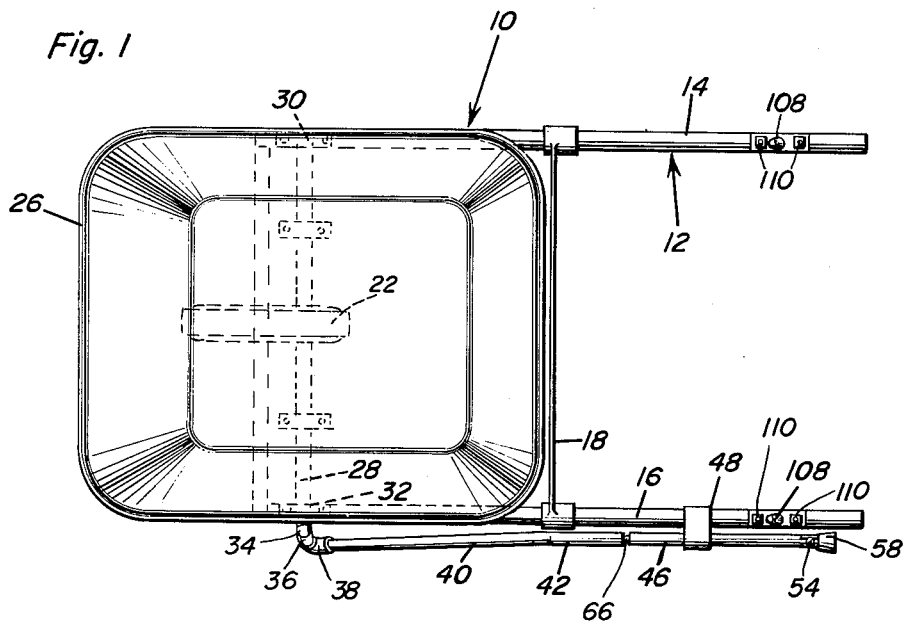
FIGURE 1 is a plan view of a wheelbarrow constructed in accordance with the invention.

With continuing reference to the drawings, numeral 10 generally represents the wheelbarrow construction including a frame 12 defining a pair of forwardly extending spaced horizontal bars 14 and 16. Secured between the bars 14 and 16 are a plurality of braces such as brace 18 in FIGURE 1. Dependingly supported from the bars 14 and 16 are members 20 which carry a front ground wheel 22 mounted for rotation. The bars 14 and 16 also dependingly carry support members 24.

The wheelbarrow construction 10 includes a barrow 26 secured to an axle 28 mounted for rotation in bearings 30 and 32 carried respectively by the bars 14 and 16. An elbow 34 connects the axle 28 to a pipe 36 while the elbow 38 connects the pipe 36 to a rigid arm 40. The arm 40 is slightly bent at 42 for purposes to be better appreciated below. The arm 40 is formed preferably of a pipe length and is of hollow construction. It is worthy of note here that the barrow 26 is secured to the axle 28 in unbalanced condition. That is, the principal portion of the barrow weight is disposed forwardly of the axle 28 so that under normal conditions, the barrow 26 will pivot the axle 28, pipe 36 and arm 40 to the position illustrated in FIGURE 3. The unbalanced weight of the barrow 26 will cause this position to be assumed when the barrow is either loaded or unloaded.

Figure 2:
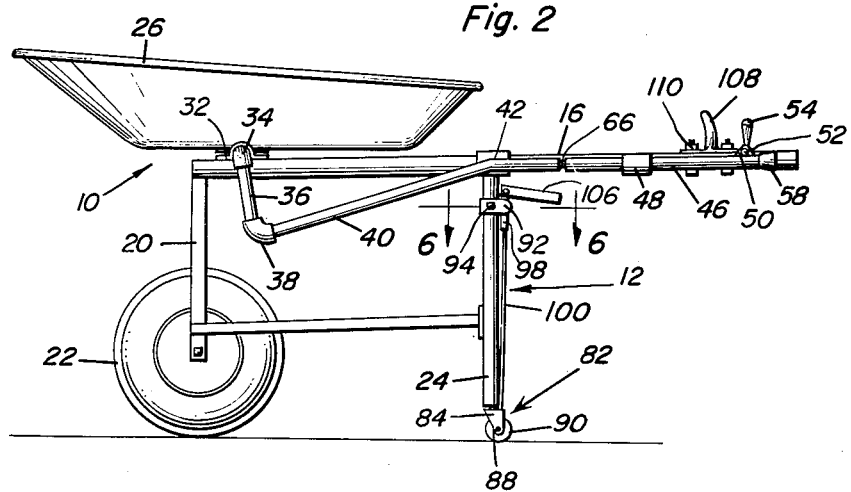
FIGURE 2 is an elevational side view of the wheelbarrow construction.
Figure 6:
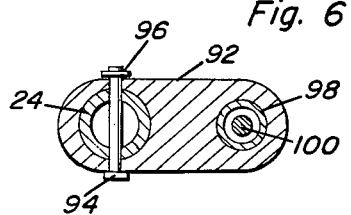
FIGURE 6 is an enlarged horizontal sectional view taken substantially along the plane 6—6 of FIGURE 2.

Novel means are provided for securing the barrow in the horizontal or loaded position of FIGURE 2. The means best illustrated in FIGURES 4 and 5 include a hollow housing 46 secured by a collar 48 adjacent the bar 16. Supported on the housing 46 is an apertured ear 50 carrying a spindle 52. An operator 54 is mounted for rotation on the spindle 52 and extends into the housing 46 through an opening 56 defined therein. A closure member 58 is threaded on the housing 46 as at 60. A coil spring 62 is disposed between the closure member 58 and the operator 54 so as to urge the operator 54 clockwise as viewed in FIGURE 4. The housing 46 defines a reduced section 64 therein which slidably receives a tongue 66 beveled at 68. A rod 70 is pivotally secured to the operator 54 and the tongue 66. Accordingly, it will be apparent that the spring 62 will cause the operator 54 to pivot clockwise so as to urge the rod 70 and tongue 66 out of the housing 46 through reduced portion 64.

The housing 46 is disposed in alignment with the hollow arm 40. It will be appreciated that when the arm 40 is manually moved so as to pivot the axle 28 clockwise, the arm 40 will engage the tongue 66 on the beveled side 68 thereof so as to urge the tongue 66, the rod 70, the operator 54, and the spring 62 rearwardly against the spring urging of the spring 62. However, when the arm 40 is moved into substantial alingment with the housing 46, the compressed spring 62 will urge the rod 70 forwardly so as to extend the tongue 66 into the hollow of arm 40. As illustrated in FIGURE 4, the tongue 66 will then retain the arm 40 as indicated in FIGURE 2 and the barrow 26 in a horizontal position. By pivoting the operator 54 counterclockwise as illustrated in FIGURE 5, the tongue 66 will be withdrawn from the arm 40 so as to allow the unbalanced barrow 26 to cause the axle 28 to pivot in the bearings 30 and 32 to dump the barrow. FIGURE 3 illustrates the dumping position of the barrow.

In order to prevent the wheelbarrow from rolling while it is being loaded or such, specially designed rear ground wheels are provided. Attention is particularly drawn to FIGURE 7. The support member 24 defines a socket therein designated as 76. Rotatably received in the socket 76 is a stub shaft 78 which is secured to the bight portion 80 of a U-shaped yoke 82. The U-shaped yoke 82 defines a pair of legs 84 and 86 depending from the bight portion 80. A spindle 88 is secured between the legs 84 and 86 and a rear ground wheel 90 is rotatably mounted thereon.

A collar 92 is secured to the support member 24 by a bolt 94 and nut 96. The collar 92 has a sleeve 98 secured thereto. A rod 100 loosely extends through the sleeve 98 and terminates in a U-shaped portion 102 secured to the yoke 82 as by welding at 104 spaced from the stub shaft 78. A handle 106 is secured to the rod 100 for turning the rod 100. Attention is called to FIGURE 3 wherein it is to be noted that upon pivoting the rod 100 by handle 106, the wheel 90 may be turned as the stub shaft 78 pivots in cavity 76 so that the wheel 90 assumes a position perpendicular to the wheel 22 so as to prevent rolling movement of the wheelbarrow 10.

In order to facilitate handling of the wheelbarrow 10, horns 108 secured to the bars 14 and 16 by bolts 110 and nuts 112 may be provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A dumping wheelbarrow comprising a frame defining a longitudinal axis, a depending wheel rotatably supported from the forward portion of said frame parallel to said axis, an axle rotatably mounted on said frame, a barrow fixed to said axle for rotation therewith, said barrow being unbalanced forward of said axle whereby said barrow will normally be disposed in a forwardly tilted position, releasable means for retaining said barrow in a horizontal position, and a rigid arm rigidly secured to said axle for rotation therewith, said releasable means including a retractible means movably secured to said frame, and biasing means normally urging said retractible means into engagement with said arm when said barrow is disposed in the horizontal position.

2. A dumping wheelbarrow comprising a frame defining a longitudinal axis, a depending wheel rotatably supported from the forward portion of said frame parallel to said axis, an axle rotatably mounted on said frame, a barrow fixed to said axle for rotation therewith, said barrow being unbalanced forward of said axle whereby said barrow will normally be disposed in a forwardly tilted position, and releasable means for retaining said barrow in a horizontal position, a rigid arm rigidly secured directly to said axle for rotation therewith, said releasable means including a retractible tongue slidably secured to said frame and spring means normally urging said tongue into engagement with said arm when said barrow is disposed in the horizontal position.

3. A dumping wheelbarrow comprising a frame defining a longitudinal axis, a depending wheel rotatably supported from the forward portion of said frame parallel to said axis, an axle rotatably mounted on said frame, a barrow fixed to said axle for rotation therewith, said barrow being unbalanced forward of said axle whereby said barrow will normally be disposed in a forwardly tilted position, and releasable means for retaining said barrow in a horizontal position, a rigid arm rigidly secured directly to said axle for rotation therewith, said releasable means including a retractible tongue, slidably secured to said frame, and spring means normally urging said tongue into engagement with said arm when said barrow is disposed in the horizontal position, a tongue operator, said operator pivotally mounted on said frame, a rigid rod secured between said operator and said tongue, said spring means including a spring secured to said frame and bearing against said operator to urge said tongue into engagement with said arm.

4. A dumping wheelbarrow comprising a frame defining a longitudinal axis, a depending wheel rotatably supported from the forward portion of said frame parallel to said axis, rear ground wheels, support means connecting said ground wheels to said frame, and operating means connected to said support means for pivoting one of said ground wheels to a position perpendicular to said axis, said support means including a U-shaped yoke defining a bight portion and a pair of spaced legs depending therefrom, a spindle secured between said legs, a ground wheel rotatably mounted on said spindle, a socket defined in said frame, a stub shaft secured to said bight portion and rotatably received in said socket.

5. A dumping wheelbarrow comprising a frame defining a longitudinal axis, a depending wheel rotatably supported from the forward portion of said frame parallel to said axis, rear ground wheels, support means connecting said ground wheels to said frame, and operating means connected to said support means for pivoting one of said ground wheels to a position perpendicular to said axis, said support means including a U-shaped yoke defining a bight portion and a pair of spaced legs depending therefrom, a spindle secured between said legs, a ground wheel rotatably mounted on said spindle, a socket defined in said frame, a stub shaft secured to said bight portion and rotatably received in said socket, said operating means including a vertical rod secured to said yoke spaced from said stub shaft, and a handle secured perpendicular to said rod for turning it.

6. A dumping wheelbarrow comprising a frame defining a longitudinal axis, a depending wheel rotatably supported from the forward portion of said frame parallel to said axis, rear ground wheels, support means connecting said ground wheels to said frame, and operating means connected to said support means for pivoting one of said ground wheels to a position perpendicular to said axis, said support means including a U-shaped yoke defining a bight portion and a pair of spaced legs depending therefrom, a spindle secured between said legs, a ground wheel rotatably mounted on said spindle, a socket defined in said frame, a stub shaft secured to said bight portion and rotatably received in said socket, said operating means including a vertical rod secured to said yoke spaced from said stub shaft, and a handle secured perpendicular to said rod for turning it, and a collar secured to said frame, said rod extending through said collar and rotatable therein.

7. A dumping wheelbarrow comprising a frame defining a longitudinal axis, a depending wheel rotatably supported from the forward portion of said frame parallel to said axis, rear ground wheels, support means connecting said ground wheels to said frame, and operating means connected to said support means for pivoting one of said ground wheels to a position perpendicular to said axis, an axle rotatably mounted on said frame, a barrow fixed to said axle for rotation therewith, said barrow being unbalanced forward of said axle whereby said barrow will normally be disposed in a forwardly tilted position, and releasable means for retaining said barrow in a horizontal position, a rigid arm rigidly secured to said axle for rotation therewith, said releasable means connected to said frame including a retractible tongue, and spring means normally urging said tongue outwardly into engagement with said arm when said barrow is disposed in the horizontal position.

8. A dumping wheelbarrow comprising a frame defining a longitudinal axis, a depending wheel rotatably supported from the forward portion of said frame parallel to said axis, rear ground wheels, support means connecting said ground wheels to said frame, and operating means connected to said support means for pivoting one of said ground wheels to a position perpendicular to said axis, an axle rotatably mounted on said frame, a barrow fixed to said axle for rotation therewith, said barrow being unbalanced forward of said axle whereby said barrow will normally be disposed in a forwardly tilted position, and releasable means for retaining said barrow in a horizontal position, a rigid arm rigidly secured to said axle for rotation therewith, said releasable means connected to said frame including a retractible tongue, and spring means normally urging said tongue outwardly into engagement with said arm when said barrow is disposed in the horizontal position, a tongue operator, said operator pivotally mounted directly on said frame, a rigid rod secured between said operator and said tongue, said spring means including a spring secured to said frame and bearing against said operator to urge said tongue into engagement with said arm.

9. A dumping wheelbarrow comprising a frame defining a longitudinal axis, a depending wheel rotatably supported from the forward portion of said frame parallel to said axis, rear ground wheels, support means connecting said ground wheels to said frame, and operating means connected to said support means for pivoting one of said ground wheels to a position perpendicular to said axis, said support means including a U-shaped yoke defining a bight portion and a pair of spaced legs depending therefrom, a spindle secured between said legs, a ground wheel rotatably mounted on said spindle, a socket defined in said frame, a stub shaft secured to said bight portion and rotatably received in said socket, an axle rotatably mounted on said frame, a barrow fixed to said axle for rotation therewith, said barrow being unbalanced forward of said axle whereby said barrow will normally be disposed in a forwardly tilted position, and releasable means for retaining said barrow in a horizontal position, a rigid arm rigidly secured directly to said axle for rotation therewith, said releasable means including a retractible tongue, slidably secured to said frame and spring means normally urging said tongue into engagement with said arm when said barrow is disposed in the horizontal position.

10. A dumping wheelbarrow comprising a frame defining a longitudinal axis, a depending wheel rotatably supported from the forward portion of said frame parallel to said axis, rear ground wheels, support means connecting said ground wheels to said frame, and operating means connected to said support means for pivoting one of said ground wheels to a position perpendicular to said axis, said support means including a U-shaped yoke defining a bight portion and a pair of spaced legs depending therefrom, a spindle secured between said legs, a ground wheel rotatably mounted on said spindle, a socket defined in said frame, a stub shaft secured to said bight portion and rotatably received in said socket, an axle rotatably mounted on said frame, a barrow fixed to said axle for rotation therewith, said barrow being unbalanced forward of said axle whereby said barrow will normally be disposed in a forwardly tilted position, and releasable means for retaining said barrow in a horizontal position, a rigid arm rigidly secured directly to said axle for rotation therewith, said releasable means including a retractible tongue, slidably secured to said frame and spring means normally urging said tongue into engagement with said arm when said barrow is disposed in the horizontal position, a tongue operator, said operator pivotally mounted on said frame, a rigid rod secured between said operator and said tongue, said spring means including a spring secured to said frame and bearing against said operator to urge said tongue into engagement with said arm.

11. A dumping wheelbarrow comprising a frame defining a longitudinal axis, a depending wheel rotatably supported from the forward portion of said frame parallel to said axis, rear ground wheels, support means connecting said ground wheels to said frame, and operating means connected to said support means for pivoting one of said ground wheels to a position perpendicular to said axis, an axle rotatably mounted on said frame, a barrow fixed to said axle for rotation therewith, said barrow being unbalanced forward of said axle whereby said barrow will normally be disposed in a forwardly tilted position, and releasable means for retaining said barrow in a horizontal position.

References Cited in the file of this patent

UNITED STATES PATENTS

| Number | Name | Date |
|---|---|---|
| 185,195 | Soule | Dec. 12, 1876 |
| 307,020 | Cummins | Oct. 21, 1884 |
| 385,849 | De Mayo | July 10, 1888 |
| 411,319 | Barr | Sept. 17, 1889 |
| 602,225 | Maxwell | Apr. 12, 1898 |
| 736,697 | Cummins | Aug. 18, 1903 |
| 741,594 | Schlachter | Oct. 13, 1903 |
| 800,159 | Kaufmann | Sept. 26, 1905 |
| 858,076 | Klemp | June 25, 1907 |
| 990,552 | Hassmann | Apr. 25, 1911 |
| 1,071,717 | Dirksen | Sept. 2, 1913 |
| 1,095,145 | Elterich | Apr. 28, 1914 |
| 1,202,601 | Snyder | Oct. 24, 1916 |
| 1,292,689 | Bludworth | Jan. 28, 1919 |
| 1,342,437 | Gordon | June 8, 1920 |
| 1,735,527 | Cwik | Nov. 12, 1929 |